US012767059B2

(12) United States Patent
Trentin et al.

(10) Patent No.: US 12,767,059 B2
(45) Date of Patent: Oct. 20, 2026

(54) CLAMP ASSEMBLY FOR RECONFIGURABLE ROOF RACK

(71) Applicant: Ford Global Technologies, LLC, Dearborn, MI (US)

(72) Inventors: Daniel Trentin, Ivanhoe (AU); David Andrew Spink, Jan Juc (AU); Peter J. Caddy, Lara (AU)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 18/651,751

(22) Filed: May 1, 2024

(65) Prior Publication Data

US 2025/0340172 A1 Nov. 6, 2025

(51) Int. Cl.
*B60R 9/058* (2006.01)

(52) U.S. Cl.
CPC .................................... *B60R 9/058* (2013.01)

(58) Field of Classification Search
CPC ........... B60R 9/058; B60R 9/00; B60R 9/045; B60R 9/052; B60R 9/04
See application file for complete search history.

(56) References Cited

U.S. PATENT DOCUMENTS 4,469,261 A * 9/1984 Stapleton ................ B60R 9/045 410/104
5,121,959 A 6/1992 King
5,511,709 A * 4/1996 Fisch ...................... B60R 9/045 224/326
5,845,828 A * 12/1998 Settelmayer ............ B60R 9/045 224/331
5,947,356 A * 9/1999 Delong ..................... B60R 9/00 403/374.5
6,116,673 A 9/2000 Clonan
6,286,739 B1 * 9/2001 Stapleton ................ B60R 9/045 224/315
7,090,103 B2 8/2006 Aftanas et al.
8,028,875 B2 * 10/2011 Kmita ..................... B60R 9/045 224/325
8,100,615 B1 1/2012 Freeborn
8,276,794 B2 10/2012 Aftanas
8,424,733 B2 * 4/2013 Polewarczyk .......... B60R 9/045 224/321
8,528,799 B2 * 9/2013 Michie .................... B60R 9/048 224/321

(Continued)

FOREIGN PATENT DOCUMENTS

KR 20050099676 A 10/2005
WO 2023043650 A1 3/2023

OTHER PUBLICATIONS

International Search Report and Written Opinion for PCT/US2022/42831.

*Primary Examiner* — Brian D Nash
(74) *Attorney, Agent, or Firm* — Vichit Chea; Carlson, Gaskey & Olds, P.C.

(57) ABSTRACT

A reconfigurable roof rack assembly of a motor vehicle may include a roof rail. The assembly may also include a cross-bar configurable between a first configuration and a second configuration. Further, the assembly may include a clamp assembly including a lever configured to apply force to a side of the cross-bar facing away from the roof rail to clamp the cross-bar in place relative to the roof rail.

20 Claims, 7 Drawing Sheets

(56) References Cited

U.S. PATENT DOCUMENTS

| | | | | |
|---|---|---|---|---|
| 8,640,934 | B2 * | 2/2014 | Jamieson | B60R 9/058 224/325 |
| 9,187,047 | B2 * | 11/2015 | Sautter | B60R 9/045 |
| 10,059,274 | B2 | 8/2018 | Kmita | |
| 10,071,692 | B2 | 9/2018 | Kmita et al. | |
| 11,007,948 | B2 * | 5/2021 | Sala | B60R 9/045 |
| 11,027,660 | B2 | 6/2021 | Gomes et al. | |
| 11,718,239 | B2 * | 8/2023 | Telukunta | B60R 9/045 224/314 |
| 2004/0134950 | A1 * | 7/2004 | Kmita | B60R 9/045 224/321 |
| 2005/0051585 | A1 * | 3/2005 | Kamiya | B60R 9/045 224/321 |
| 2006/0060621 | A1 * | 3/2006 | Klinkman | B60R 9/045 224/321 |
| 2007/0236035 | A1 | 10/2007 | Waldner | |
| 2008/0252100 | A1 * | 10/2008 | Salvador | B60R 9/045 296/185.1 |
| 2009/0242599 | A1 * | 10/2009 | Stahl | B60R 9/045 224/309 |
| 2017/0096177 | A1 | 4/2017 | Eddings, Jr. et al. | |
| 2017/0320445 | A1 * | 11/2017 | Aftanas | B60R 9/045 |
| 2018/0111542 | A1 * | 4/2018 | Mueller | B60R 9/06 |
| 2020/0055457 | A1 * | 2/2020 | Mansour | B60R 9/045 |
| 2025/0340172 | A1 * | 11/2025 | Trentin | B60R 9/058 |

* cited by examiner

CLAMP ASSEMBLY FOR RECONFIGURABLE ROOF RACK

TECHNICAL FIELD

This disclosure relates to a clamp assembly for a reconfigurable roof rack of a motor vehicle.

BACKGROUND

Some motor vehicles include roof rack assemblies, which may be referred to as "roof racks," which include roof rails extending along the sides of a roof. Roof rails are used as mounting points for gear, such as luggage or sporting equipment. Some roof rack assemblies also include cross-bars that extend between the roof rails. The cross-bars provide additional mounting points for gear, for example.

SUMMARY

In some aspects, the techniques described herein relate to a roof rack assembly for a motor vehicle, including: a roof rail; a cross-bar configurable between a first configuration and a second configuration; and a clamp assembly including a lever configured to apply force to a side of the cross-bar facing away from the roof rail to clamp the cross-bar in place relative to the roof rail.

In some aspects, the techniques described herein relate to a roof rack assembly, wherein: the clamp assembly is configurable between a locked position, an exchange position, and an unlocked position, in the locked position, the clamp assembly is configured to prevent rotational and vertical movement of the cross-bar relative to the roof rail, in the exchange position, the clamp assembly is configured to permit the cross-bar to be detached from the clamp assembly, and in the unlocked position, the clamp assembly is configured to permit the cross-bar to rotate relative to the roof rail.

In some aspects, the techniques described herein relate to a roof rack assembly, wherein, in the unlocked position, the lever restricts vertical movement of the cross-bar.

In some aspects, the techniques described herein relate to a roof rack assembly, wherein the cross-bar is configurable between the first configuration and the second configuration when the clamp assembly is not in the locked position.

In some aspects, the techniques described herein relate to a roof rack assembly, wherein: in the first configuration the cross-bar is substantially parallel to the roof rail, and in the second configuration the cross-bar is substantially perpendicular to the roof rail.

In some aspects, the techniques described herein relate to a roof rack assembly, wherein the lever includes a cam configured to contact the side of the cross-bar facing away from the roof rail.

In some aspects, the techniques described herein relate to a roof rack assembly, wherein the clamp assembly further includes a shaft attached to the lever.

In some aspects, the techniques described herein relate to a roof rack assembly, wherein, when the clamp assembly is in an exchange position, the lever is substantially parallel with the shaft.

In some aspects, the techniques described herein relate to a roof rack assembly, wherein: the cross-bar includes a through-hole adjacent an end thereof, and when the clamp assembly is in a locked position and an unlocked position, a portion of the shaft projects through the through-hole.

In some aspects, the techniques described herein relate to a roof rack assembly, wherein: the through-hole exhibits a first dimension and a second dimension, the first dimension is greater than a width of the lever, and the second dimension is less than the width of the lever.

In some aspects, the techniques described herein relate to a roof rack assembly, wherein the lever is rotatably attached to the shaft.

In some aspects, the techniques described herein relate to a roof rack assembly, wherein: a head is arranged at an opposite end of the shaft as the lever, the head exhibits an increased diameter relative to the shaft, the roof rail includes a roof rail foot, the roof rail foot includes a through-bore receiving the head and a portion of the shaft, the through-bore includes a first section adjacent the cross-bar and exhibiting a first diameter, the through-bore includes a second section exhibiting a second diameter greater than the first diameter, and the head is arranged in the second section.

In some aspects, the techniques described herein relate to a roof rack assembly, wherein: the through-bore exhibits a shoulder at an intersection of the first section and the second section, and when the clamp assembly is in a locked position, the cam is configured to apply force to the shaft such that the head contacts the shoulder.

In some aspects, the techniques described herein relate to a roof rack assembly, wherein the side of the cross-bar facing away from the roof rail includes a recess configured to at least partially receive the lever when the clamp assembly is in a locked position and an unlocked position.

In some aspects, the techniques described herein relate to a roof rack assembly, wherein, when the clamp assembly is in the locked position, the lever is in contact with a pedestal within the recess such that a space is provided between the recess and the lever.

In some aspects, the techniques described herein relate to a roof rack assembly, wherein: the roof rail includes a first roof rail foot and second roof rail foot spaced-apart from the first roof rail foot, the clamp assembly is a first clamp assembly, the first clamp assembly is adjacent the first roof rail foot, the roof rack assembly further includes a second clamp assembly adjacent the second roof rail foot, and the second clamp assembly includes a lever configured to apply force on the side of the cross-bar facing away from the roof rail.

In some aspects, the techniques described herein relate to a roof rack assembly, wherein: the roof rail includes a central section extending between the first and second roof rail feet, and when the cross-bar is in the first configuration, the cross-bar vertically overlaps at least a portion of the first roof rail foot, the second roof rail foot, and the central section.

In some aspects, the techniques described herein relate to a roof rack assembly, wherein: the roof rail is a first roof rail, the cross-bar is a first cross-bar, the roof rack assembly further includes a second roof rail spaced-apart from the first roof rail, the roof rack assembly further includes a second cross-bar configurable between a first configuration and a second configuration, the roof rack assembly further includes third and fourth clamp assemblies adjacent the second roof rail, when the first and second cross-bars are in respective first configurations, the first and second clamp assemblies clamp the first cross-bar in place, and the second the third clamp assemblies clamp the second cross-bar in place, and when the first and second cross-bars are in respective second configurations, the first and third clamp assemblies clamp the first cross-bar in place, and the second and fourth clamp assemblies clamp the second cross-bar in place.

In some aspects, the techniques described herein relate to a method, including: clamping a cross-bar to a roof rail of a motor vehicle by rotating a lever of a clamp assembly such that the lever applies force to a side of the cross-bar facing away from the roof rail.

In some aspects, the techniques described herein relate to a method, further including: rotating the lever of the clamp assembly and detaching cross-bar from the clamp assembly; and after detaching the cross-bar, moving the cross-bar between a first configuration and a second configuration relative to the roof rail.

BRIEF DESCRIPTION OF THE DRAWINGS

In FIG. 5, the clamp assembly is in an exchange position.

In FIG. 6, the clamp assembly is in a locked position.

In FIG. 7, the clamp assembly is in an unlocked position.

DETAILED DESCRIPTION

This disclosure relates to a clamp assembly for a reconfigurable roof rack of a motor vehicle. In particular, the clamp assembly includes a lever configured to selectively apply force to a side of a cross-bar facing away from a roof rail (i.e., a top side of the cross-bar). When in a locked position, the clamp assembly prevents rotational and vertical movement of the cross-bar. Further, a user can move the lever such that the clamp assembly is no longer in the locked position, thereby permitting the cross-bar to be moved into another configuration. These and other benefits will be appreciated from the following description.

Figure 1:
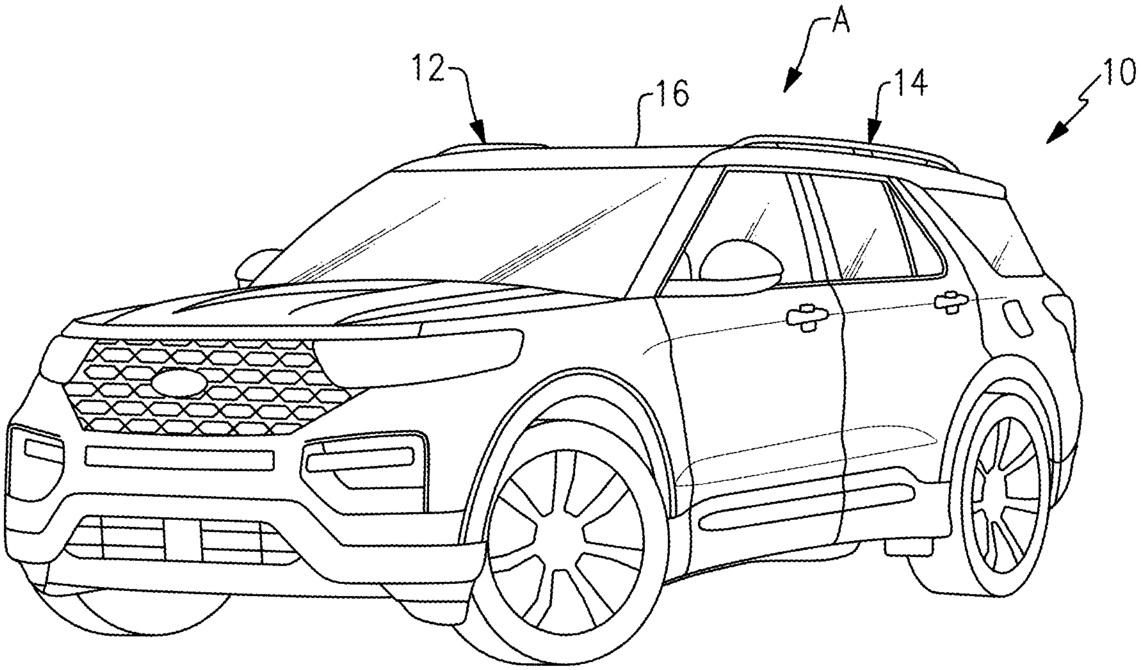
FIG. 1 illustrates a motor vehicle with a roof rack assembly.

Referring to the drawings, FIG. 1 is a front-perspective view of a motor vehicle 10 ("vehicle 10"). While in FIG. 1 the vehicle 10 is shown as a sport utility vehicle (SUV), this disclosure is also applicable to other types of vehicles. The vehicle 10 includes a roof rack assembly, or "roof rack," A including first and second roof rails 12, 14 extending along opposite sides of a roof 16 of the vehicle 10.

Figure 2:
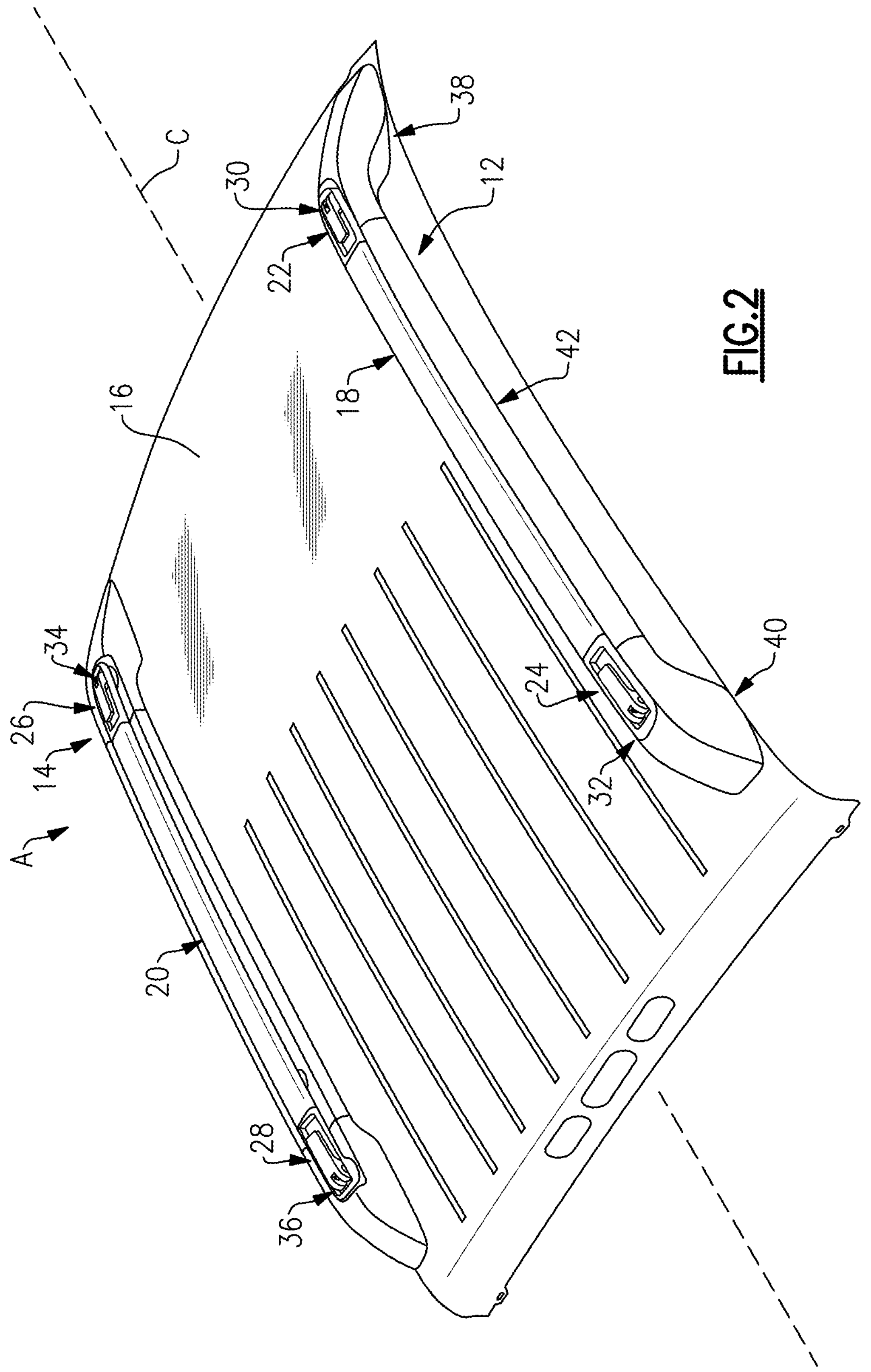
FIG. 2 is a rear perspective view of a roof rack assembly, with cross-bars in a first configuration.
Figure 3:
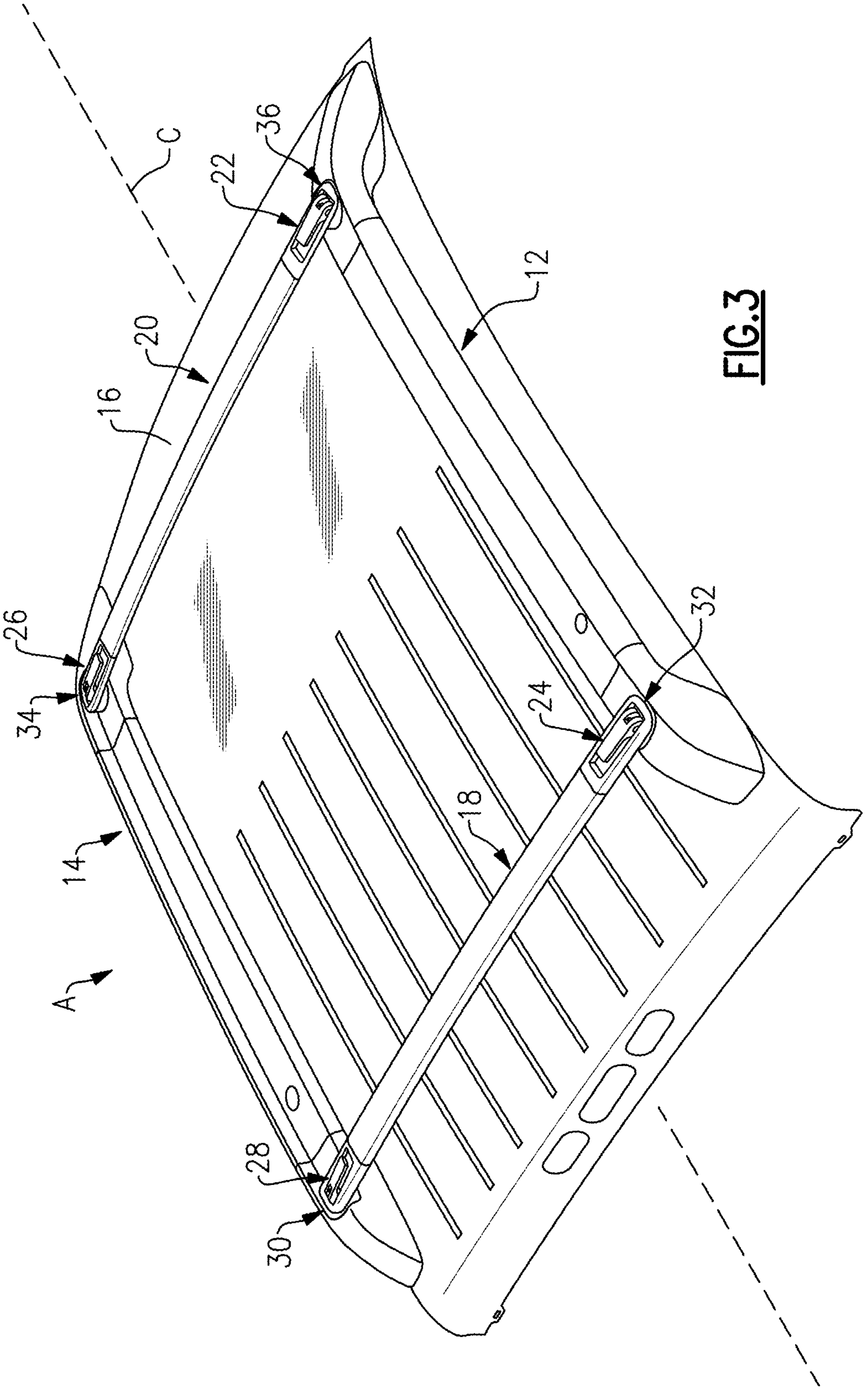
FIG. 3 is a view similar to FIG. 2, with the cross-bars in a second configuration.
Figure 4:
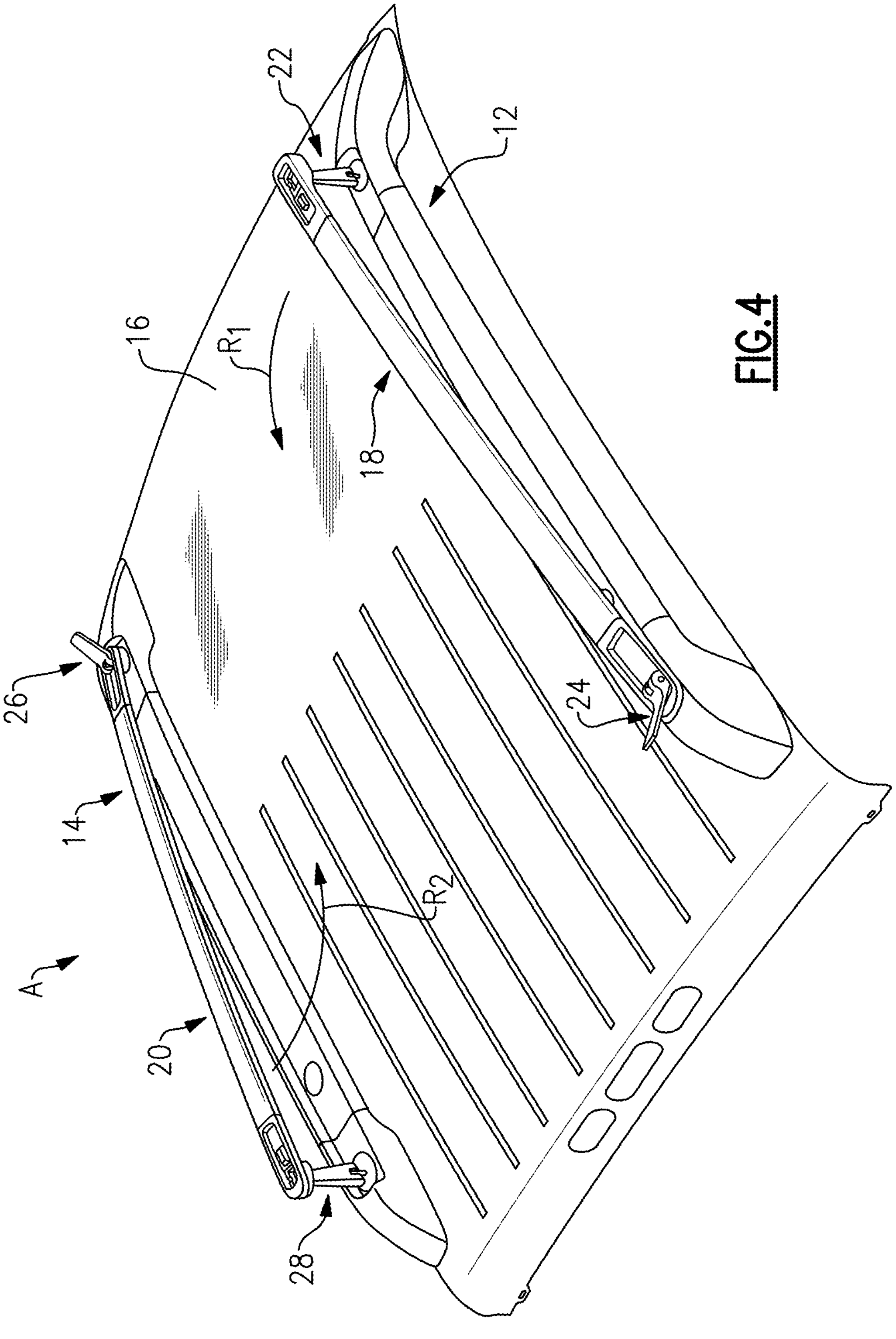
FIG. 4 is a view similar to FIGS. 2 and 3, and is representative of the cross-bars being moved from the first configuration to the second configuration.

FIGS. 2-4 illustrate additional views of the roof rack assembly A from a rear perspective, and in particular from a rear perspective on a side of the vehicle 10, which, in regions such as North America, is the passenger side of the vehicle 10.

The roof rack assembly A further includes at least one cross-bar which is configurable between first and second configurations. The first and second configurations of the at least one cross-bar may be referred to as configurations of the roof rack assembly A or configurations of the cross-bar. In the first configuration, the roof rack assembly A is configured substantially as roof rails without cross-bars, whereas in the second configuration, the roof rack assembly A is configured as roof rails with cross-bars extending therebetween. The roof rails and cross-bars provide attachment points for mounting gear, for example, relative to the roof rack assembly A. Depending on the type of gear to be mounted, a user may select to configure the roof rack assembly A in either the first or second configuration.

In the embodiment of FIGS. 2-4, the roof rack assembly A includes a first cross-bar 18 and a second cross-bar 20. The first and second cross-bars 18, 20 are configurable between a first configuration (FIG. 2) and a second configuration (FIG. 3). As shown in FIG. 2, in the first configuration the first and second cross-bars 18, 20 are substantially parallel to the first and second roof rails 12, 14 (i.e., a length dimension of each of the first and second cross-bars 18, 20 is substantially parallel to a length dimension of the first and second roof rails 12, 14) and are also substantially parallel to a centerline C of the vehicle 10. As shown in FIG. 3, in the second configuration the first and second cross-bars 18, 20 are substantially perpendicular to the first and second roof rails 12, 14 and are also substantially perpendicular to a centerline C of the vehicle 10.

The roof rack assembly A further includes at least one clamp assembly configured to selectively lock a cross-bar in place and to facilitate movement of the cross-bar between the first and second configurations. In the embodiment of FIGS. 2-4, the roof rack assembly A includes four clamp assemblies 22, 24, 26, 28.

Each of the clamp assemblies 22, 24, 26, 28, in this disclosure, is configurable between a locked position, an exchange position, and an unlocked position, as will be discussed below. In the locked position, the clamp assemblies 22, 24, 26, 28 are configured to clamp one of the cross-bars 18, 20 in place relative to one of the roof rails 12, 14. In the exchange position, the clamp assemblies 22, 24, 26, 28 are configured to release and/or receive the cross-bars 18, 20. In the unlocked position, the clamp assemblies 22, 24, 26, 28 are configured to permit the cross-bars 18, 20 to rotate relative to the corresponding roof rail 12, 14, and in particular are configured to permit the cross-bars 18, 20 to pivot, or swing, when moving between the first and second configurations.

The cross-bars 18, 20 and clamp assemblies 22, 24, 26, 28 are configured to be moved between configurations when the vehicle 10 is stationary only.

In FIG. 2, the first and second cross-bars 18, 20 are in the first configuration and the clamp assemblies 22, 24, 26, 28 are in a locked position in which the clamp assemblies 22, 24, 26, 28 hold the first and second cross-bars 18, 20 in place relative to the first and second roof rails 12, 14. Specifically, the first clamp assembly 22 is engaged with the first cross-bar 18 adjacent a first end 30 of the first cross-bar 18, and the second clamp assembly 24 is engaged with the first cross-bar 18 adjacent a second end 32 of the first cross-bar 18. Further, the third clamp assembly 26 is engaged with the second cross-bar 20 adjacent a first end 34 of the second cross-bar 20, and the fourth clamp assembly 28 is engaged with the second cross-bar 20 adjacent a second end 36 of the second cross-bar 20.

In order to move the first and second cross-bars 18, 20 between the first and second configurations, the clamp assemblies 22, 24, 26, 28 are moved from a locked position to either the exchange position or an unlocked position. In one embodiment of this disclosure, each of the clamp assemblies 22, 24, 26, 28 are moveable between the locked position, exchange position, and the unlocked position such that a user has freedom to choose how to move the first and second cross-bars 18, 20 between the first and second configurations. In another embodiment of this disclosure, one of the clamp assemblies 22, 24 is moveable only between the locked position and the exchange position, and the other of the clamp assemblies 22, 24 is moveable only between the locked position and the unlocked position. In this same example, one of the clamp assemblies 26, 28 is moveable only between the locked position and the exchange position, and the other of the clamp assemblies 26, 28 is moveable only between the locked position and the unlocked position. In that example, the first and second cross-bars 18, 20 are only rotatable in one direction between the first and second configurations.

In the example of FIG. 4, clamp assembly 22 is in the exchange position, and clamp assembly 24 is in the unlocked position. As such the first cross-bar 18 can be detached from the clamp assembly 22 and pivoted about the clamp assembly 24 in direction R1 to the second configuration of FIG. 3. Further, in FIG. 4, clamp assembly 28 is in the exchange position, and clamp assembly 26 is in the unlocked position. As such the second cross-bar 20 can be detached from the clamp assembly 28 and pivoted about the clamp assembly 26 in direction R2 to the second configuration of FIG. 3.

With reference to when the first and second cross-bars 18, 20 are in the second configuration, as shown in FIG. 3, the first and third clamp assemblies 22, 26 are in the locked position and are engaged with the second cross-bar 20 to hold the second cross-bar 20 in place such that the second cross-bar 20 spans between the first and second roof rails 12, 14. Likewise, the second and fourth clamp assemblies 24, 28 are in the locked position and are engaged with the first cross-bar 18 to hold the first cross-bar 18 in place such that the first cross-bar 18 spans between the first and second roof rails 12, 14.

With reference to FIG. 2, the first roof rail 12 includes a first roof rail foot 38, a second roof rail foot 40, and a central section 42 spanning between the first and second roof rail feet 38, 40. The second roof rail 14 is configured similarly.

When the first cross-bar 18 is in the first configuration, the first cross-bar 18 vertically overlaps at least a portion of the first roof rail foot 38, the second roof rail foot 40, and the central section 42. The first roof rail foot 38, the second roof rail foot 40, and the central section 42 are configured to contact and support the first cross-bar 18 from below. The first cross-bar 18, the first roof rail foot 38, the second roof rail foot 40, and the central section 42 may include complimentary projections and/or recesses configured to facilitate engagement and/or alignment of the first cross-bar 18 relative to the first roof rail 12. The first and second roof rail feet 38, 40 are sections of the first roof rail 12. Among other structures, the first and second roof rail feet 38, 40 include structures configured to connect to, and contact, the roof 16. The central section 42 does not directly contact the roof 16, in this example. The central section 42 may contact the roof 16 in other examples. The second roof rail 14, and the second cross-bar 20, are configured similarly.

Figure 5:
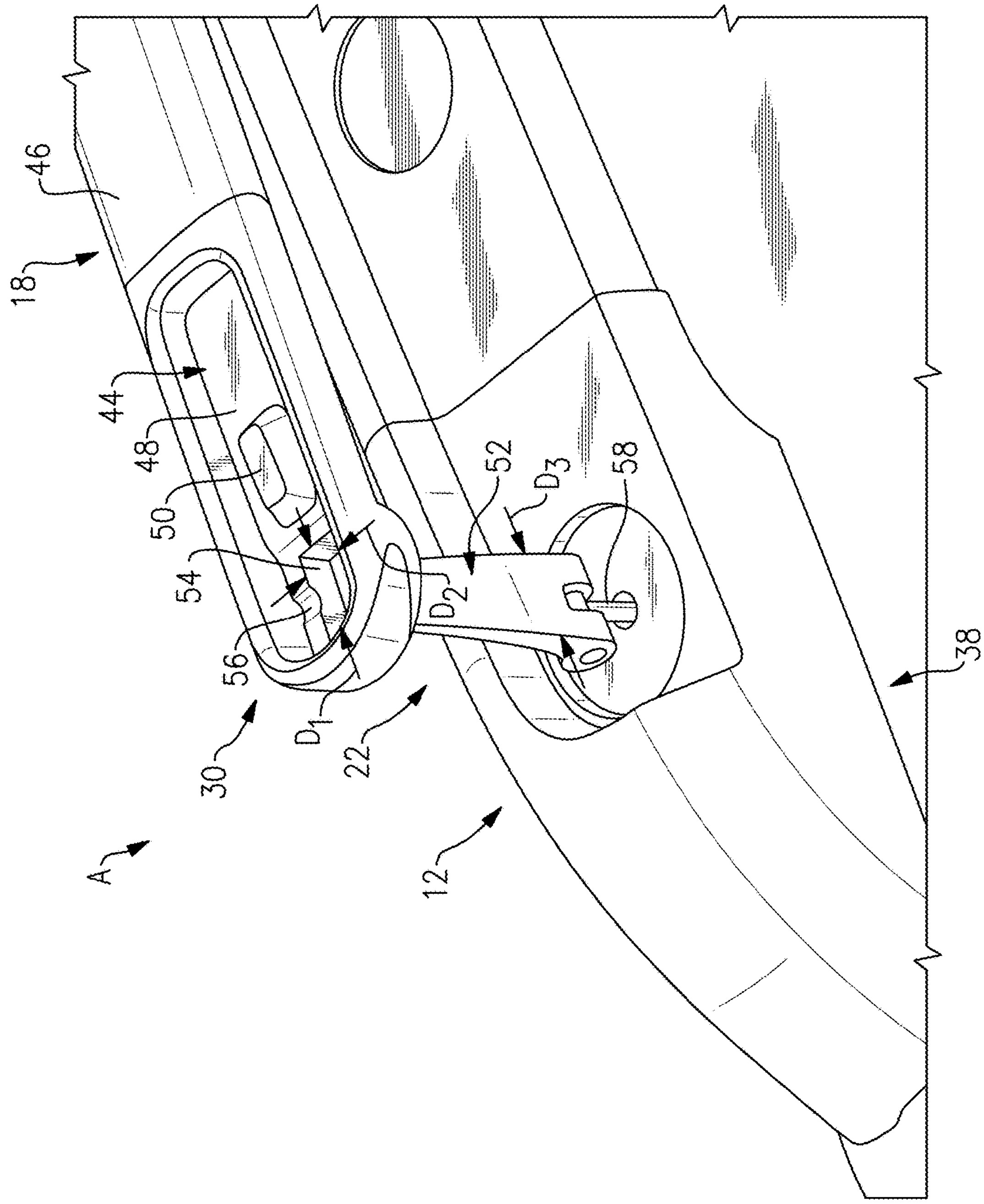
FIG. 5 is a close-up view of an end of one of the cross-bars, an example clamp assembly, and a portion of a roof rail.

FIG. 5 is a perspective view of a portion of the roof rack assembly A, and specifically illustrates an arrangement of the first clamp assembly 22 relative to the first roof rail foot 38 and a portion of the first cross-bar 18 adjacent the first end 30. In FIG. 5, the first clamp assembly 22 is in the exchange position. A portion of the first cross-bar 18 adjacent the end 30 could be provided by a separate end cap attached to a remainder of the first cross-bar 18, in some examples. While the first clamp assembly 22, first cross-bar 18, and first roof rail foot 38 are shown, it should be understood that the clamp assemblies 24, 26, 28, second cross-bar 20, and additional roof rail feet, including second roof rail foot 40 and the roof rail feet of the second cross-bar 20, are configured similarly.

Adjacent the end 30, the first cross-bar 18 includes a recess 44, which is recessed relative to an uppermost surface 46 of the first cross-bar 18. The recess 44 includes a bottom wall 48. Within the recess 44, a pedestal 50 projects upward from the bottom wall 48, but does not project out of the recess 44. The pedestal 50 is configured to contact a lever 52 of the first clamp assembly 22 when the lever 52 is in the locked position. By doing so, the pedestal 50 provides space between the lever 52 and the bottom wall 48 for fingers of a user to fit underneath the lever 52, for example, to increase the ease of access to the lever 52. As will be appreciated from the below, the lever 52 may be configured as a cam lever, which is also known as a quick release cam lever.

The first-cross-bar 18 further includes a through-hole 54. The through-hole is rectangularly-shaped, in this example, exhibiting a dimension D1 in a direction parallel to a length of the first cross-bar 18, and exhibiting a dimension D2 perpendicular to the length of the first cross-bar 18. When the lever 52 is oriented as shown in FIG. 5, with the width dimension D3 of the lever 52 parallel to the dimension D1, the first cross-bar 18 can be released (i.e., detached) from the first clamp assembly 22, or attached to the clamp assembly 22, by substantially vertical movement of the first cross-bar 18 relative to the first clamp assembly 22. The term "substantially vertical" in this context refers to the fact that the first cross-bar 18 is being moved vertically while also pivoting about second clamp assembly 24. The dimension D1 is greater than width D3, and the second dimension D2 is less than the width D3.

The first cross-bar 18 further includes grooves 56 on opposite sides of the through-hole 54. The grooves 56 extend parallel to the dimension D2 in this example. The grooves 56 are configured to interface with the lever 52 when the first clamp assembly 22 is in the locked and unlocked positions.

Figure 6:
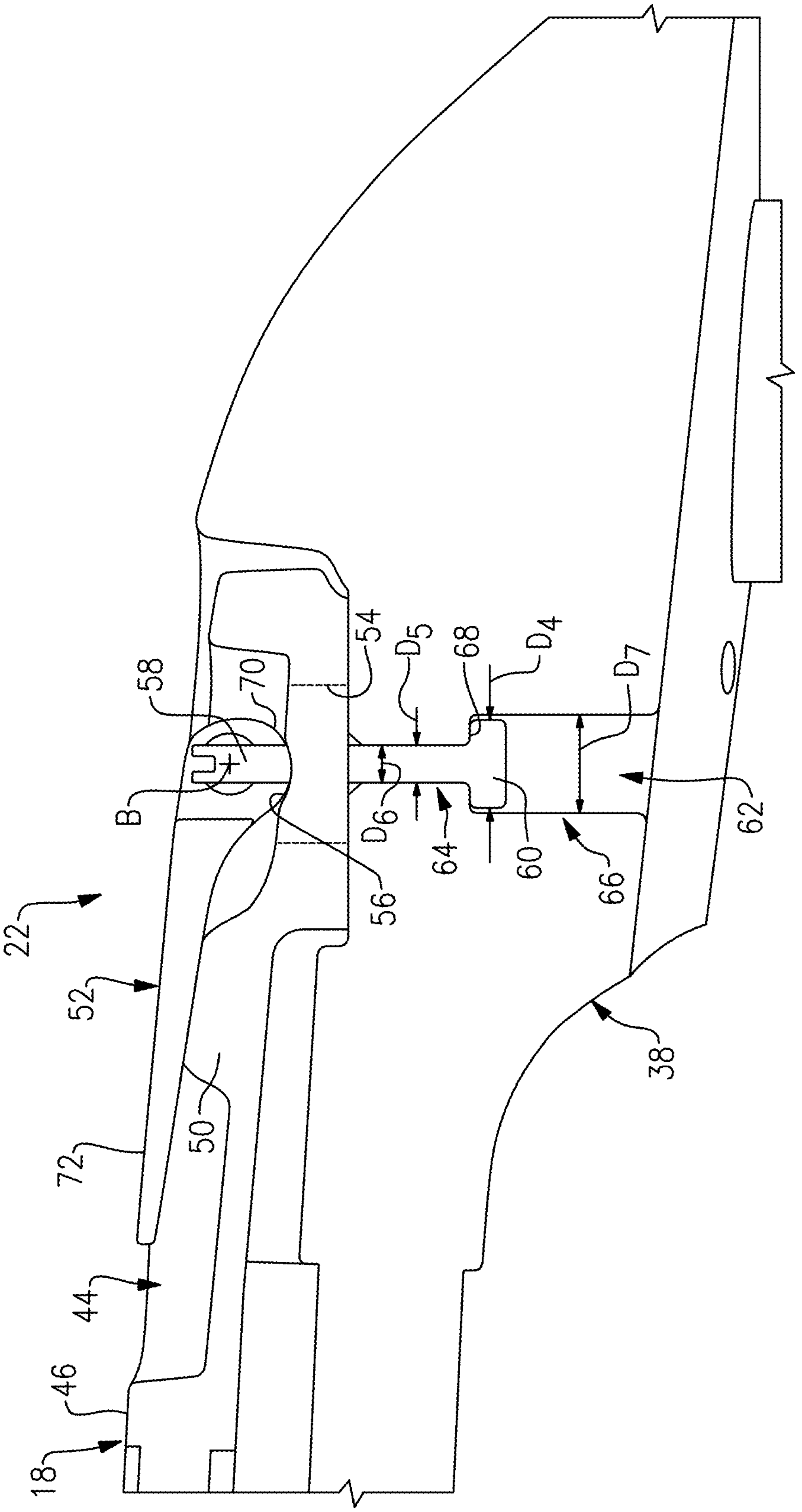
FIG. 6 is a cross-sectional view of the end of one of the cross-bars, the example clamp assembly, and the portion of the roof rail.

FIG. 6 illustrates the first clamp assembly 22 in the locked position relative to the first roof rail foot 38 and the first cross-bar 18. In addition to the lever 52, the first clamp assembly 22 includes a shaft 58. The lever 52 is rotatably attached to the shaft 58 about an axis B, which extends into and out of the page relative to FIG. 6.

The first clamp assembly 22 further includes a head 60. The head 60 could be formed as a separate structure, such as a nut, from the shaft 58, and then connected to the shaft 58 in a separate assembly step, such as by tightening the nut relative to the shaft 58. Alternatively, the head 60 could be formed integrally with shaft 58. Head 60 is arranged at an opposite end of the shaft 58 as the lever 52. As shown, the head 60 exhibits an increased diameter D4 relative to the shaft 58, which exhibits a diameter D5. In one example, such as when the head 60 is provided by a nut, the shaft 58 could be at least partially threaded. In that example, relative rotation between the shaft 58 and head 60 can adjust a clamping force applied to the first cross-bar 18 by the first clamp assembly 22 when in the locked position. Alternatively, the top of shaft 58 could contain an internal hex drive interface and the lever 52 could contain an access slot, for example, such that a clamp adjustment can be made without the need to disassemble any components. In other examples, the shaft 58 could exhibit a smooth outer surface.

A portion of the shaft 58 and the head 60 are received in a through-bore 62 of the first roof rail foot 38. The through-bore 62 includes a first section 64 adjacent the first cross-bar 18 and exhibiting a first diameter D6, and the through-bore 62 further includes a second section 66 exhibiting a second diameter D7 greater than the first diameter D6. A portion of the shaft 58 is received in the first section 64. Head 60 is arranged in the second section 66. Further, the through-bore 62 exhibits a shoulder 68 at the intersection of the first and second sections 64, 66.

Adjacent the shaft 58, the lever 52 includes a cam 70. The cam 70 is a portion of the lever 52 exhibiting a shaped profile configured to translate rotation of the lever 52 about a pin arranged about axis B into a vertical force being applied to the shaft 58, which is then translated into a force being applied to the first cross-bar 18. The cam 70 is shaped to correspond to grooves 56 in this example. In the locked position, the cam 70 is within the grooves 56, and the lever 52, via the cam 70, is configured to apply force to the shaft 58 such that the head 60 contacts the shoulder 68, which in turn causes the lever 52 to apply force to the first cross-bar 18, thereby clamping the first cross-bar 18 in place relative to the first roof rail foot 38. As shown, in the locked position, first cross-bar 18 is vertically between the lever 52 and the first roof rail foot 38. Therefore, in the locked position, the lever 52 is configured to apply force to, and thereby exert pressure on, the side of the first cross-bar 18 facing away from the first roof rail 12 (i.e., the top side of the first cross-bar 18), namely by applying force to the grooves 56 via direct contact between the cam 70 and grooves 56. In this disclosure, the lever 52 directly contacts the first cross-bar 18 without any intervening structures, such as an elastomeric cushion or damper, between the lever 52 and the first cross-bar 18, which reduces relative movement between the first clamp assembly 22 and the first cross-bar 18.

Further, in the locked position, the lever 52 is in direct contact with an upper surface of pedestal 50, and an uppermost surface 72 of the lever 52 is substantially vertically aligned (i.e., level, or flush) with the uppermost surface 46 of the first cross-bar 18.

In the locked position, the width D3 of lever 52 is parallel with the dimension D2 such that the lever 52 cannot pass through the through-hole 54. In the locked position, the lever 52 is substantially perpendicular to the shaft 58. In the exchange position of FIG. 5, however, the lever 52 is substantially parallel with the shaft 58, and the width D3 is parallel with the dimension D1 such that the lever 52 can pass through the through-hole 54.

Figure 7:
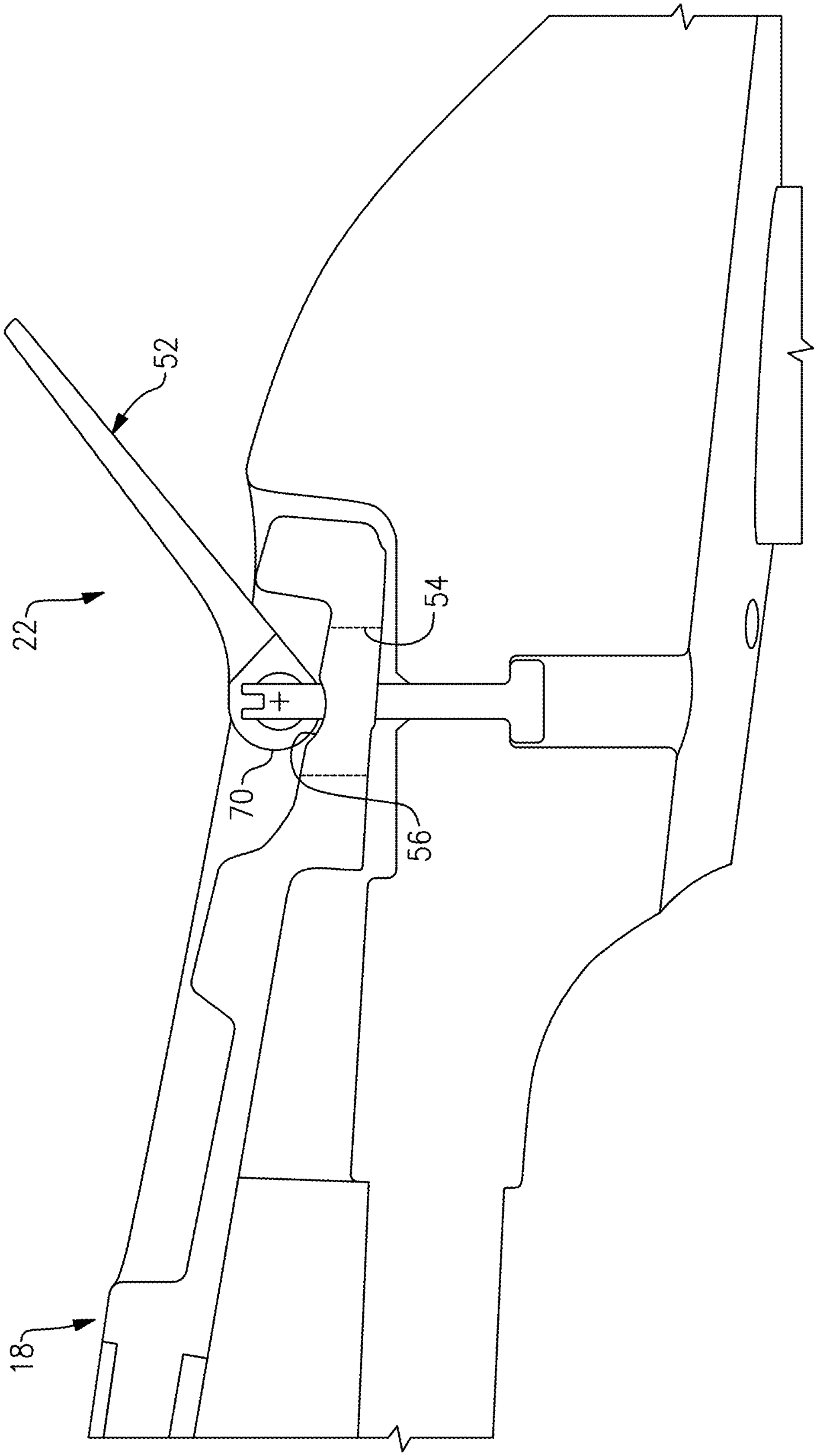
FIG. 7 is a cross-sectional view of the end of one of the cross-bars, the example clamp assembly, and the portion of the roof rail.

In the unlocked position, shown in FIG. 7, the lever 52 is in contact with the grooves 56 but has rotated out of the locked position. As with the locked position, in the unlocked position the width D3 of lever 52 is parallel with the second dimension D2 such that the lever 52 cannot pass through the through-hole 54. The lever 52, by virtue of the shape of the cam 70, applies a lesser force to the shaft 58 in the unlocked position when compared to the locked position. In the unlocked position, the first clamp assembly 22 permits rotation of the first cross-bar 18 and permits some minimal vertical movement of the first cross-bar 18, such that the opposite end 32 can be pivoted about the first clamp assembly 22 and lifted above the second clamp assembly 24 when the second clamp assembly 24 is in the exchange position. That said, vertical movement of the first cross-bar 18 is still restricted by the lever 52 when the first clamp assembly 22 is in the unlocked position, such that the first cross-bar 18 cannot be released from the first clamp assembly 22 in the unlocked position. In the unlocked position, the lever 52 is configured to permit the first cross-bar 18 to rotate about the longitudinal axis of the shaft 58. In an example, the lever 52 rotates with rotation of the first cross-bar 18. In the locked position, by comparison, the first clamp assembly 22 prevents vertical and rotational movement of the first cross-bar 18 relative to the first roof rail 12.

Directional terms such as "upward," "upper," "above," "downward," "lower," "under," "below," "side," "inside," "outside," "horizontal," etc., are used herein with reference to the normal operational attitude of a motor vehicle. It should be understood that terms such as "slightly," "minimal," "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A roof rack assembly for a motor vehicle, comprising:

a roof rail;

a cross-bar configurable between a first configuration and a second configuration; and a clamp assembly including a lever configured to apply force to a side of the cross-bar facing away from the roof rail to clamp the cross-bar in place relative to the roof rail, wherein the clamp assembly is configurable between a locked position, an exchange position, and an unlocked position, and wherein, in the exchange position, the clamp assembly is configured to permit the cross-bar to be detached from the clamp assembly.

2. The roof rack assembly as recited in claim 1, wherein:

in the locked position, the clamp assembly is configured to prevent rotational and vertical movement of the cross-bar relative to the roof rail, and in the unlocked position, the clamp assembly is configured to permit the cross-bar to rotate relative to the roof rail.

3. The roof rack assembly as recited in claim 2, wherein, in the unlocked position, the lever restricts vertical movement of the cross-bar.

4. The roof rack assembly as recited in claim 1, wherein:

in the first configuration the cross-bar is substantially parallel to the roof rail, and in the second configuration the cross-bar is substantially perpendicular to the roof rail.

5. The roof rack assembly as recited in claim 1, wherein the lever includes a cam configured to contact the side of the cross-bar facing away from the roof rail.

6. The roof rack assembly as recited in claim 5, wherein the clamp assembly further comprises a shaft attached to the lever.

7. The roof rack assembly as recited in claim 6, wherein, when the clamp assembly is in an exchange position, the lever is substantially parallel with the shaft.

8. The roof rack assembly as recited in claim 6, wherein:

the cross-bar includes a through-hole adjacent an end thereof, and when the clamp assembly is in a locked position and an unlocked position, a portion of the shaft projects through the through-hole.

9. The roof rack assembly as recited in claim 8, wherein:

the through-hole exhibits a first dimension and a second dimension, the first dimension is greater than a width of the lever, and the second dimension is less than the width of the lever.

10. The roof rack assembly as recited in claim 9, wherein:

a head is arranged at an opposite end of the shaft as the lever, the head exhibits an increased diameter relative to the shaft, the roof rail includes a roof rail foot, the roof rail foot includes a through-bore receiving the head and a portion of the shaft, the through-bore includes a first section adjacent the cross-bar and exhibiting a first diameter, the through-bore includes a second section exhibiting a second diameter greater than the first diameter, and the head is arranged in the second section.

11. The roof rack assembly as recited in claim 10, wherein:

the through-bore exhibits a shoulder at an intersection of the first section and the second section, and when the clamp assembly is in a locked position, the cam is configured to apply force to the shaft such that the head contacts the shoulder.

12. The roof rack assembly as recited in claim 1, wherein the side of the cross-bar facing away from the roof rail includes a recess configured to at least partially receive the lever when the clamp assembly is in a locked position and an unlocked position.

13. The roof rack assembly as recited in claim 12, wherein, when the clamp assembly is in the locked position, the lever is in contact with a pedestal within the recess such that a space is provided between the recess and the lever.

14. The roof rack assembly as recited in claim 1, wherein:

the roof rail includes a first roof rail foot and second roof rail foot spaced-apart from the first roof rail foot, the clamp assembly is a first clamp assembly, the first clamp assembly is adjacent the first roof rail foot, the roof rack assembly further comprises a second clamp assembly adjacent the second roof rail foot, and the second clamp assembly includes a lever configured to apply force on the side of the cross-bar facing away from the roof rail.

15. The roof rack assembly as recited in claim 14, wherein:

the roof rail is a first roof rail, the cross-bar is a first cross-bar, the roof rack assembly further comprises a second roof rail spaced-apart from the first roof rail, the roof rack assembly further comprises a second cross-bar configurable between a first configuration and a second configuration, the roof rack assembly further comprises third and fourth clamp assemblies adjacent the second roof rail, when the first and second cross-bars are in respective first configurations, the first and second clamp assemblies clamp the first cross-bar in place, and the third and fourth clamp assemblies clamp the second cross-bar in place, and when the first and second cross-bars are in respective second configurations, the first and third clamp assemblies clamp the first cross-bar in place, and the second and fourth clamp assemblies clamp the second cross-bar in place.

16. The roof rack assembly as recited in claim 1, wherein, in the exchange position, the cross-bar is removable from an entirety of the clamp assembly, and the clamp assembly remains mounted to the roof rail when the cross-bar is removed from the clamp assembly.

17. A method, comprising:

clamping a cross-bar to a roof rail of a motor vehicle by rotating a lever into a locked position of a clamp assembly in which the lever applies force to a side of the cross-bar facing away from the roof rail, wherein the lever is rotatable to configure the clamp assembly in the locked position, an unlocked position, and an exchange position;

rotating the lever of the clamp assembly to configure the clamp assembly in the exchange position; and detaching the cross-bar from the clamp assembly when the clamp assembly is in the exchange position.

18. The method as recited in claim 17, further comprising:

after detaching the cross-bar, moving the cross-bar between a first configuration and a second configuration relative to the roof rail.

19. The method as recited in claim 17, wherein:

the cross-bar includes a through-hole exhibiting a first dimension and a second dimension less than the first dimension, the lever exhibits a width, in the exchange position, the width of the lever is parallel to the first dimension such that the lever is passable through the through-hole and the cross-bar is removable from the lever, and in the locked position and the unlocked position, the width of the lever is parallel to the second dimension such that the lever is not passable through the through-hole and the lever holds the cross-bar in place.

20. A roof rack assembly for a motor vehicle, comprising:

a roof rail;

a cross-bar configurable between a first configuration and a second configuration, the cross-bar including a through-hole exhibiting a first dimension and a second dimension less than the first dimension; and a clamp assembly mounted to the roof rail and including a lever and a shaft, the lever exhibiting a width and being rotatably attached to the shaft, the lever rotatable relative to the shaft between an exchange position, a locked position, and an unlocked position, wherein, in the exchange position, the width of the lever is parallel to the first dimension such that the lever is passable through the through-hole and the cross-bar is removable from the clamp assembly while the clamp assembly remains mounted to the roof rail, and wherein, in the locked position and the unlocked position, the width of the lever is parallel to the second dimension such that the lever is not passable through the through-hole and the lever holds the cross-bar in place relative to the roof rail.

* * * * *